No. 629,899. Patented Aug. 1, 1899.
J. H. FLYNN.
GUIDE PULLEY.
(Application filed Mar. 29, 1899.)
(No Model.)
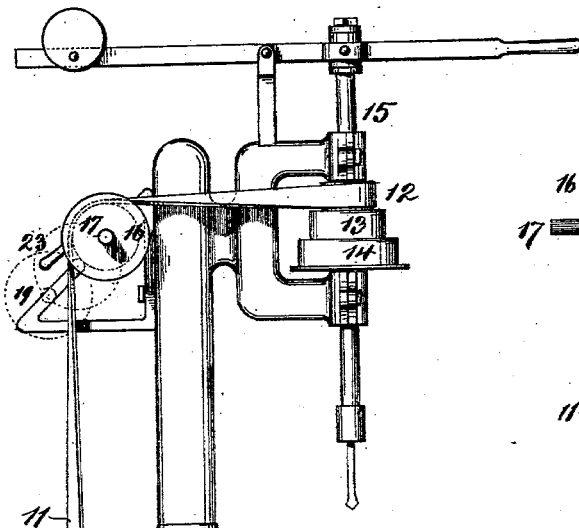
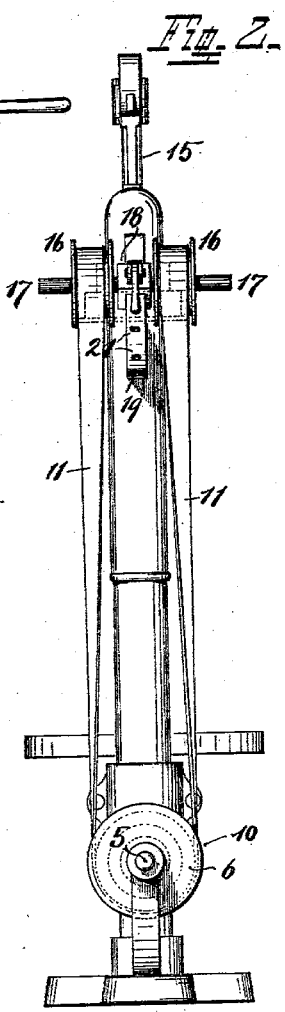
Witnesses
John C. Rogers
Edward P. Smith
Inventor
John H. Flynn
by C. Spengel Atty.

UNITED STATES PATENT OFFICE.

JOHN H. FLYNN, OF CINCINNATI, OHIO.

GUIDE-PULLEY.

SPECIFICATION forming part of Letters Patent No. 629,899, dated August 1, 1899.

Application filed March 29, 1899. Serial No. 710,873. (No model.)

*To all whom it may concern:*

Be it known that I, JOHN H. FLYNN, a citizen of the United States, and a resident of Cincinnati, Hamilton county, State of Ohio, have invented certain new and useful Improvements in Guide-Pulleys for Angular Belt Transmission; and I do declare the following to be a clear, full, and exact description of the invention, such as will enable others skilled in the art to which it appertains to make and use the same, attention being called to the accompanying drawings, with the reference-numerals marked thereon, which form a part of this specification.

This invention relates to means for supporting pulleys used as guide-pulleys to guide belts where the transmission of power by them from one shaft to another is at an angle and where the belt operates in conjunction with so-called "speed-cones." These latter consist of a number of pulleys side by side, but of different diameters, so that as the belt is shifted from one to the other a variable speed may be had. When so changing the speed by adjusting the position of the belt from one set of pulleys to another, it is evident that the guide-pulleys supporting the belt in its angular position must also be adjusted to meet the new position of the belt. This adjustment must be further such as to preserve the proper tension of the belt, and if such should be lost special means permitting additional adjustment must be provided to permit the tension to be restored. My invention contemplates a construction whereby these guide-pulleys are supported in such a manner that their adjustment to a new position is always correct, in this way that it also embraces maintenance of the proper tension in the new position, and therefore the adjustment of this latter requires no special attention.

My invention is applicable in all cases where power is transmitted by belts at an angle and where the driver and the driven pulleys consist of speed-cones. For the purpose of explaining it I have shown my invention in connection with a drill-press, to which it is applied merely and no parts of which are considered as new.

In the following specification, and particularly pointed out in the claims at the end thereof, is found a full description of my invention, together with its operation, parts, and construction, which latter is also illustrated in the accompanying drawings, in which—

Figures 1 and 2 show, respectively, a side and a rear elevation of a drill-press provided with my invention. Fig. 3 shows a detached detail view of the support for the guide-pulleys.

5 is the counter-shaft, being provided with tight and loose pulleys 6 and 7, respectively, the former for driving the shaft, which has also mounted on it a speed-cone, consisting of pulleys 8, 9, and 10, from either one of which, by means of a belt 11, motion is transmitted to a similar speed-cone, consisting of pulleys 12, 13, and 14, mounted on the drill-spindle 15, for the purpose of driving the same. Since this latter and the counter-shaft are supported at an angle to each other, it becomes necessary that the belt transmit the power accordingly, for which purpose it is also arranged at an angle, which is done by means of guide-pulleys 16. There are two of them—one for each branch of the belt—and they are loosely supported on stud-shafts 17, projecting one from each side of a bearing 18. This latter is supported on an inclined bracket 19, secured in the present case to the machine-frame—that is, to the column of the drill. The manner of supporting bearing 18 is such as to permit it to slide freely on the inclined projecting part of the bracket. When the belt is shifted from one set of pulleys to another, the bearing carrying the guide-pulleys is simply moved up or down on the inclined part of bracket 19. Supporting the guide-pulleys in this manner—that is, so that during adjustment they move on an inclined plane—has the additional effect of maintaining always the tension of the belt while being shifted from one position to another. This is by reason of the inclined part of the bracket changing the position of the guide-pulleys at once in two planes—that is, vertically as well as horizontally—so that the slack which would result if only adjusted in one plane is immediately taken up by the simultaneous adjustment in the other plane. Thus, for instance, referring to Fig. 1, where the belt is shown as engaging the uppermost pulley on the spindle, if the guide-pulleys were merely lowered straight down for shifting the belt to engage one of the lower pulleys such lowering would immediately slacken the upright portion of the belt and render further transmission of power impossible. By adjusting, however, the support of the guide-pulleys in the manner shown—that is, on an inclined line—whereby it is not merely lowered, but also changed in position horizontally, the change in this latter direction compensates at once for the slack which would otherwise result from changing the position merely vertically, so that the tension of the belt remains unaffected and requires no further attention. By reason of the strain of the belt engaging the guide-pulleys equally horizontally as well as vertically and centrally opposite their support the mean resultant of this strain acts against the inclined portion of bracket 19, and thereby causes bearing 18 to readily find its proper position between the two strains automatically, and in which position it also remains without any locking means. Since this adjustment would, however, not in all cases be prompt nor accurate, it is preferable to move the support to its intended position. To indicate this latter, I provide suitable marks or depressions, preferably in shape of sockets 21, one for each of the positions which the pulleys may occupy, (see dotted lines,) and which sockets are to be engaged by a member connected to the slidable bearing. In this case I use a locking-pin 22, projecting from a hand-lever 23, pivoted to bearing 18. As shown, the inclination of the bracket is at an angle of forty-five degrees, since the belts transmit at a right angle. My invention may, however, be also used where the belts transmit at an angle other than a right one, and therefore to include all such cases the rule may be stated to be that the guide-pulleys should be adjustable on a line the direction of which is such as to be at right angles to a line which bisects the angle under which the belt operates. The position of the guide-pulleys changes also laterally—that is, sometimes they are closer together—according to the size of the pulley which the belt engages. This adjustment is, however, accomplished entirely by the belt itself and by means of the flanges projecting from the guide-pulleys, which latter are capable for such purpose of sliding on their shafts 17.

Having described my invention, I claim as new—

1. A bearing for guide-pulleys used in angular belt transmission and means on which it is adjustably supported, the supporting-surface on which such adjustment takes place, being disposed at right angles to a line which bisects the angle under which the belt operates.

2. The combination of two shafts supported at an angle, a speed-cone on each, a belt for transmitting motion from one shaft to the other, guide-pulleys to sustain the belt at the requisite angle and an inclined bracket supported between the two shafts which carry the guide-pulleys they being capable of a sliding adjustment thereon.

3. The combination of guide-pulleys used in angular belt transmission shafts on which they are loosely mounted and an inclined bracket on which these pulleys and their shafts are carried in a manner to be capable of a sliding adjustment thereon.

4. The combination of guide-pulleys sustaining belts which transmit at an angle, shafts on which they are loosely mounted, a sliding bearing from which these shafts project and an inclined bracket which supports this bearing.

5. Guide-pulleys which sustain belts transmitted at an angle, shafts on which they are loosely mounted, a sliding bearing from which these shafts project, an inclined bracket which supports this bearing and means to lock this latter to the former.

6. The combination of a machine-frame, two shafts supported at a right angle, a speed-cone on each, a belt to transmit motion from one to the other, guide-pulleys to sustain the belt in its angular position and an inclined bracket projecting from the machine-frame at an angle of forty-five degrees on which these guide-pulleys are adjustably supported.

7. The combination of an inclined bracket 19, a sliding bearing 18 adjustably mounted thereon, shafts 17 projecting from each side thereof and belt guide-pulleys mounted loosely on these shafts in a manner to be capable of a longitudinal adjustment thereon.

In testimony whereof I hereunto set my hand in presence of two witnesses.

JOHN H. FLYNN.

Witnesses:
H. EVERSMANN,
C. SPENGEL.